United States Patent
Kucera

[19]

[11] Patent Number: 6,130,289

[45] Date of Patent: Oct. 10, 2000

[54] AQUEOUS PHENOLIC DISPERSION

[75] Inventor: Helmut W. Kucera, Erie County, Pa.

[73] Assignee: Lord Corporation, Cary, N.C.

[21] Appl. No.: 09/235,777

[22] Filed: Jan. 22, 1999

Related U.S. Application Data

[60] Provisional application No. 60/072,887, Jan. 27, 1998.

[51] Int. Cl.$^7$ .............................. C08J 3/00; C08K 3/20; C08L 51/00; C08L 61/00; C08L 81/00

[52] U.S. Cl. .................. 524/841; 524/541; 524/594; 524/595; 524/596; 524/609; 525/390; 525/397; 525/480; 525/505; 427/372.2; 427/385.5; 427/388.1; 427/388.2; 427/388.3; 427/388.4; 428/460

[58] Field of Search ...................... 524/541, 594, 524/595, 596, 609, 841; 525/390, 397, 480, 505; 428/460; 427/372.2, 385.5, 388.1, 388.2, 388.3, 388.4

[56] References Cited

U.S. PATENT DOCUMENTS

| | | |
|---|---|---|
| 2,621,164 | 12/1952 | Nagy . |
| 4,102,832 | 7/1978 | Weissenfels et al. . |
| 4,400,229 | 8/1983 | Demmer et al. . |
| 4,587,291 | 5/1986 | Gardziella et al. . |
| 4,708,974 | 11/1987 | Chang et al. . |
| 4,859,717 | 8/1989 | Hoskin et al. . |
| 4,883,824 | 11/1989 | Meunier et al. . |
| 4,945,077 | 7/1990 | Meunier et al. . |
| 5,017,683 | 5/1991 | Otani et al. . |
| 5,098,774 | 3/1992 | Chang . |
| 5,162,156 | 11/1992 | Troughton, Jr. et al. ............... 428/460 |
| 5,182,347 | 1/1993 | Gerber . |
| 5,218,010 | 6/1993 | Gerber . |
| 5,548,015 | 8/1996 | Bourlier et al. . |

FOREIGN PATENT DOCUMENTS

| | | |
|---|---|---|
| 55-115481 | 9/1980 | Japan . |
| 58-127755 | 7/1983 | Japan . |
| 60-149652 | 8/1985 | Japan . |
| 3-84057 | 4/1991 | Japan . |
| 7-133405 | 5/1995 | Japan . |
| WO 95/23038 | 8/1995 | WIPO . |

OTHER PUBLICATIONS

Gilbert, Everett E. "Sulfonation and Related Reactions" p. 308 (Wiley & Sons 1965).

Hsu, K.C. and Lee, Y.F., "Water–Soluble Sulfonated Phenolic Resins. I. Synthesis", *Journal of Applied Polymer Science*, vol. 57, 1501–1509 (1995).

Hsu, K.C., Lee, Y.F. and Chiang, S.Y., "Water–Soluable Sulfonated Phenolic Resins. II Surface Property and Effectiveness as a Dispersing Agent", *Journal of Applied Polymer Science.*, vol. 57, 1205–1209 (1995).

*Primary Examiner*—Patrick D. Niland
*Attorney, Agent, or Firm*—Wayne W. Rupert

[57] ABSTRACT

An aqueous phenolic resin dispersion that includes an aqueous continuous phase and, dispersed within the aqueous phase, the reaction product of a phenolic resin precursor and a modifying agent wherein the modifying agent includes at least one ionic group and at least one functional moiety that enables the modifying agent to undergo condensation with the phenolic resin precursor. The resulting dispersed phenolic resin reaction product includes at least one phenolic ring to which is bound the ionic group from the modifying agent. The pendant ionic group is a sulfate, sulfonate, sulfinate, sulfenate or oxysulfonate and the reaction-enabling moiety preferably is a hydroxy or hydroxyalkyl.

81 Claims, No Drawings

AQUEOUS PHENOLIC DISPERSION

This application claims benefit of U.S. Provisional Application No. 60/072,887, filed Jan. 27, 1998.

BACKGROUND OF THE INVENTION

The present invention relates to aqueous phenolic resin dispersions, particularly dispersions of highly reactive, polar resole and novolak resins.

The need for waterborne compositions to replace solvent-borne compositions for purposes of reducing volatile organic compounds (VOC) is well-documented. Aqueous phenolic dispersions are known, but typically they have been prepared using protective colloids such as polyvinyl alcohol as stabilizing agents. However, polyvinyl alcohol stabilization only is effective for higher molecular weight, hydrophobic phenolic resins having a smaller number of free alkylol or hydroxy functional groups. Polyvinyl alcohol stabilization techniques are not effective for many applications requiring high polarity, highly reactive phenolic resins having a high amount of alkylol or hydroxy functional groups (see, for example, U.S. Pat. No. 5,548,015). Such highly alkylol- or hydroxy-functional phenolic resins usually have lower molecular weight and are more hydrophilic than those presently adequately stabilized by polyvinyl alcohol. If polyvinyl alcohol is tried for dispersing such highly polar and reactive hydrophilic phenolic resins, dispersion is not initially possible or the initial dispersion will phase separate over a short period of time. The polyvinyl alcohol-modified-phenolic resin molecules are polar and thus at least partially water soluble and they form larger agglomerations that are more difficult to maintain in a dispersed condition.

The difficulty of making aqueous dispersions of hydrophilic phenolic resins is addressed in U.S. Pat. No. 5,548,015 to Bourlier et al., particularly with respect to attempted stabilization with polyvinyl alcohol. According to Bourlier et al., an aqueous dispersion that includes a hydrophilic phenolic resin can be made by blending a hydrophobic etherified bisphenol A resin into the dispersion.

Water soluble phenolic resins are also known but these suffer from severe drawbacks that prevent their use to form robust, environmentally resistant films. Before being thermoset, films formed from water soluble phenolic resins tend to re-solvate when exposed to water. The source of the water can be an aqueous covercoat applied to the film. Application of the aqueous covercoat essentially washes away the film formed from the water soluble phenolic resin. In addition, water soluble phenolic resins that have been extensively ionically modified often have both low molecular weight and low reactivity thus making it difficult to obtain high crosslink density. The lack of crosslink density and the relatively high amount of ionic content means that such films exhibit very limited resistance to corrosive fluids. Moreover, water soluble novolak phenolic resins require a large amount of formaldehyde curatives. Formaldehyde has recently come under increased regulatory scrutiny.

Therefore, there is a need for an aqueous phenolic resin dispersion that includes a minimum amount of VOC (preferably is VOC-free), is storage stable for a sufficient period of time prior to use and can be easily mixed with other components to produce a useful composition. Another important desirable feature of an improved aqueous phenolic resin dispersion is superior environmental resistance of a film or coating made from the aqueous phenolic resin dispersion. In particular, it is desirable to improve the environmental resistance performance of aqueous rubber-to-metal adhesion primers that include polyvinyl alcohol-stabilized phenolic resin dispersions as described in U.S. Pat. No. 5,200,455.

The art that appears to be most closely related to the chemistry of the present invention is summarized briefly below. None of these documents, however, teach an aqueous phenolic resin dispersion.

The condensation product of 2-naphthalenesulfonic acid with formaldehyde is known as a tanning agent or a dispersing agent (see Gilbert, *Sulfonation and Related Reactions*, page 308 (Wiley & Sons 1965)). Along these lines, U.K. Patent Specification No. 1,469,993 relates to the use of $C_{1-4}$-alkylnaphthalenesulfonic acids or formaldehyde condensates thereof in the aqueous emulsion polymerization of chloroprene. According to an English translation, JP-B-87/047225 relates to a pressure sensitive adhesive composition that includes naphthalene sulfonic acid-formalin condensate and a desensitizing agent. The condensation product of phenol with formaldehyde in the presence of sulfuric acid is also known as a tanning agent (see U.S. Pat. No. 2,621,164).

U.S. Pat. No. 4,708,974 relates to a gel-forming composition that is derived from an aldehyde combined with various types of sulfonated phenolic compounds. The gel-forming composition is injected into subterranean reservoirs to enhance hydrocarbon recovery.

Examples 15 and 16 describe mixing a resole, aqueous formaldehyde and 2,5-dihydroxy-1,4-benzenedisulfonic acid, disodium salt and water. The resulting solution was titrated with sodium hydroxide and then heated at 100–105° C. for 16 hours to produce a gel.

U.S. Pat. Nos. 4,883,824 and 4,945,077 relate to a closed cell phenolic resin foam that is made by mixing a phenolic resin with a free acid catalyst, a surface active agent and a blowing agent. Liquid frothable phenol-aldehyde resole resins are mentioned as preferred. Aromatic sulfonic acids, including phenol sulfonic acid and naphthalene sulfonic acid, are listed as preferred free acid catalysts.

U.S. Pat. Nos. 5,182,347 and 5,218,010 relate to a ceramic or refractory composition that includes magnesia aggregate, a curable liquid phenolic resin, and an accelerator for accelerating the hardening of the composition. The phenolic resin can be a resole in an aqueous solution. Naphthalenesulfonic acid and the ammonium salt of naphthalenesulfonic acid are included in the extensive list of possible accelerators.

U.S. Pat. No. 4,587,291 relates to a binder composition that includes an acid curing phenol resole resin and a curing agent that is a copper, aluminum or iron(III) salt of an aromatic sulfonic acid. Phenolsulfonic, tetrahydronaphthalenesulfonic acid, napthalenesulfonic, naphthalenedisulfonic and alkylnaphthalenesulfonic are explicitly listed as possible curing agents.

The use of sulfonated phenol-formaldehyde condensation product to impart stain resistance to polyamide materials is known (see, for example, U.S. Pat. No. 5,098,774). U.S. Pat. No. 5,098,774 relates to a method for preparing a novolak salt that includes condensing a sulfonated aromatic compound with a non-sulfonated phenolic compound and an aldehyde or aldehyde precursor then reacting the condensate with a divalent metal oxide or hydroxide or the divalent metal salt of a weak acid. Sulfonated naphthalene is listed as a possible sulfonated aromatic compound.

SUMMARY OF THE INVENTION

According to the present invention, there is provided a stable, substantially VOC-free aqueous phenolic resin dispersion that is easy to use and provides a cured film or coating on a substrate surface that exhibits superior environmental resistance. Particularly notable is that the invention provides a mechanism for making stable, useful aqueous dispersions of highly reactive, hydrophilic resole and novolak resins.

The aqueous phenolic resin dispersion includes an aqueous phase and, dispersed within the aqueous phase, the reaction product of a phenolic resin precursor, a modifying agent and, optionally, a multi-hydroxy phenolic compound wherein the modifying agent includes at least one functional moiety that enables the modifying agent to react with the phenolic resin precursor and at least one ionic moiety. According to one embodiment the modifying agent is an aromatic compound. According to another embodiment, the ionic moiety of the modifying agent is sulfate, sulfonate, sulfinate, sulfenate or oxysulfonate and the dispersed phenolic resin reaction product has a carbon/sulfur atom ratio of 20:1 to 200:1.

There also is provided according to the invention a method for preparing a phenolic resin dispersion comprising reacting, in the presence of water, a phenolic resin precursor, a modifying agent and, optionally, a multi-hydroxy phenolic compound wherein the modifying agent includes at least one functional moiety that enables reacting the modifying agent with the phenolic resin precursor and at least one ionic group.

It is believed that the functional moiety enables the modifying agent to undergo condensation with the phenolic resin precursor so that the ionic moiety is pendantly bound to a phenolic ring in the reaction product. In other words, the dispersed phenolic resin is a high molecular weight resin that is modified to include pendant ionic moieties on its phenolic backbone structure.

DETAILED DESCRIPTION OF THE PREFERRED EMBODIMENTS

Unless otherwise indicated, description of components in chemical nomenclature refers to the components at the time of addition to any combination specified in the description, but does not necessarily preclude chemical interactions among the components of a mixture once mixed.

Certain terms used in this document are defined below.

"Phenolic compound" means a compound that includes at least one hydroxy functional group attached to a carbon atom of an aromatic ring. Illustrative phenolic compounds include unsubstituted phenol per se, substituted phenols such as alkylated phenols and multi-hydroxy phenols, and hydroxy-substituted multi-ring aromatics. Illustrative alkylated phenols include methylphenol (also known as cresol), dimethylphenol (also known as xylenol), 2-ethylphenol, pentylphenol and tert-butyl phenol. "Multi-hydroxy phenolic compound" means a compound that includes more than one hydroxy group on each aromatic ring. Illustrative multi-hydroxy phenols include 1,3-benzenediol (also known as resorcinol), 1,2-benzenediol (also known as pyrocatechol), 1,4-benzenediol (also known as hydroquinone), 1,2,3-benzenetriol (also known as pyrogallol), 1,3,5-benzenetriol and 4-tert-butyl-1,2-benzenediol (also known as tert-butyl catechol). Illustrative hydroxy-substituted multi-ring aromatics include 4,4'-isopropylidenebisphenol (also known as bisphenol A), 4,4'methylidenebisphenol (also known as bisphenol F) and naphthol.

"Aldehyde compound" means a compound having the generic formula RCHO. Illustrative aldehyde compounds include formaldehyde, acetaldehyde, propionaldehyde, n-butylaldehyde, n-valeraldehyde, caproaldehyde, heptaldehyde and other straight-chain aldehydes having up to 8 carbon atoms, as well as compounds that decompose to formaldehyde such as paraformaldehyde, trioxane, furfural, hexamethylenetriamine, acetals that liberate formaldehyde on heating, and benzaldehyde.

"Phenolic resin" generally means the reaction product of a phenolic compound with an aldehyde compound. The molar ratio of aldehyde (for example, formaldehyde) to phenolic in a phenolic resin is referred to herein as the "F/P ratio". The F/P ratio is calculated on a per hydroxy-substituted aromatic ring basis.

"Phenolic resin precursor" means the unmodified or conventional phenolic resin that is reacted with the modifying agent to produce the phenolic resin that is dispersed in an aqueous phase.

An important advantage of the present invention is that it can provide a stable aqueous dispersion of a host of useful phenolic resins. Phenolic resin precursors that can be dispersed according to the invention include both hydrophobic and hydrophilic resoles and novolaks.

The dispersion of hydrophilic phenolic resins is especially useful since coatings made from hydrophilic phenolic resins can provide higher crosslink density and hence generally provide superior resistance to chemical attack when compared to hydrophobic phenolic resins. Hydrophilic phenolic resins have a higher amount of hydroxy, alkylol or benzyl ether groups compared to hydrophobic phenolic resins. The hydrophilicity of resoles and novolaks is characterized differently herein. The hydrophilicity of resoles is characterized in terms of F/P ratio; the hydrophilicity of novolaks is characterized in terms of the amount of the novolak's hydroxy substituents. The amount of hydroxy substituents is derived from the amount of multi-hydroxy phenolic compound that are used to make the novolak.

The inventor has found that phenolic resins, particularly highly reactive, highly functional, hydrophilic phenolic resins, can be stably dispersed in an aqueous phase by modifying the phenolic resins to incorporate aromatic rings that have ionic pendant groups into the phenolic resin structure. According to one embodiment, conventional or commercially available phenolic resins, particularly resoles, are reacted with a modifying agent to accomplish incorporation of the ionic pendant group-containing aromatic rings. According to another embodiment, the incorporation of the ionic pendant group-containing aromatic rings is accomplished by reacting a modifying agent in situ with other reactants used to make the phenolic resin. In situ modification is especially useful with novolaks.

While not wishing to be bound by a particular theory, it is believed that the ionic pendant groups enable the phenolic resin reaction product to maintain a stable dispersion in water. Very fine water insoluble particles of the phenolic resin reaction product are stably dispersed in an aqueous medium. The composition of the invention exhibits a Tyndall effect thereby confirming the existence of a colloidal dispersion. The average particle size preferably is less than 1000 nm for resoles and less than 100 nm for novolaks. The dispersion of the invention has a shelf-life stability of a minimum of three months. In other words, the dispersion will not phase separate or form a non-redispersable sedimentation layer for at least three months after formulation.

The phenolic resin precursor is reacted or mixed with the modifying agent—theoretically via a condensation reaction between the phenolic resin precursor and the modifying agent. The modifying agent contains at least two distinct functional moieties or groups.

One functional moiety provides the ionic pendant group that enables stable dispersion of the phenolic resin. Without the ionic pendant group, the phenolic resin would be unable to maintain a stable dispersion in water. Since the ionic pendant group provides for the stability of the dispersion there is no need, or at the most a minimal need, for surfactants. The presence of surfactants in an aqueous composition is a well-known hindrance to the composition's performance.

The other important functional moiety in the modifying agent enables the modifying agent to react with the phenolic resin precursor. The modifying agent can contain more than one ionic pendant group and more than one reaction-enabling moiety.

Incorporation of aromatic sulfonate functional moieties into the phenolic resin structure via condensation is the preferred method of providing the ionic pendant groups. Accordingly, one class of ionic moieties are substituents on an aromatic ring that include a sulfur atom covalently or ionically bonded to a carbon atom of the aromatic ring. Examples of covalently bound sulfur-containing substituents are sulfonate (—S(O)$_2$O$^-$M$^+$), sulfinate (—S(O)O$^-$M$^+$), sulfenate (—SO$^-$M$^+$) and oxysulfonate (—OS(O)$_2$O$^-$M$^+$), wherein M can be any monovalent ion such as Na, Li, K, or NR$^1_3$ (wherein R$^1$ is hydrogen or an alkyl). An example of a covalently bound substituent is sulfate ion. Sulfonate is the preferred ionic group. The modifying agent should not include or introduce any multivalent ions into the phenolic resin dispersion since it is expected that the presence of multivalent ions would cause the phenolic resin to precipitate rather than remain dispersed.

The reaction-enabling functional moiety of the modifying agent can be any functional group that provides a site on the modifying agent for undergoing condensation with a phenolic resin. If the phenolic resin precursor is a resole, the modifying agent reacts with an alkylol or benzyl ether group of the resole. If the modifying agent is aromatic, the reaction-enabling functional moiety is a substituent on the aromatic ring that causes a site on the ring to be reactive to the alkylol or benzyl ether of the resole precursor. An example of such a substituent is a hydroxy or hydroxyalkyl, with hydroxy being preferred. The hydroxy- or hydroxyalkyl-substituted aromatic modifying agent is reactive at a site ortho and/or para to each hydroxy or hydroxyalkyl substituent. In other words, the aromatic modifying agent is bonded to, or incorporated into, the phenolic resin precursor at sites on the aromatic ring of the modifying agent that are ortho and/or para to a hydroxy or hydroxyalkyl substituent. At least two reaction-enabling functional moieties are preferred to enhance the reactivity of the aromatic modifying agent with the phenolic resin precursor.

Alternatively, the reaction-enabling functional moiety of the modifying agent can be a formyl group (—CHO), preferably attached to a carbon atom of an aromatic ring. In this instance, the phenolic resin precursor is a novolak rather than a resole. The novolak precursor is reacted via an acid catalyzed aldehyde condensation reaction with the formyl group-containing modifying agent so that the formyl group forms a divalent methylene linkage to an active site on an aromatic ring of the backbone structure of the novolak precursor. Consequently, the modifying agent structure (including the ionic moiety) is incorporated into the phenolic structure through the generated methylene linkage. Examples of such formyl group-containing modifying agents include 2-formylbenzene sulfonate, 5-formylfuran sulfonate, and (R)(SO$_3$)CH—CH$_2$—C(O)(H) compounds wherein R is C$_1$–C$_4$ alkyl groups.

Another alternative reaction-enabling functional moiety could be a diazo group (—N$_2^+$), preferably attached to a carbon atom of an aromatic ring. In this instance, the phenolic resin precursor is a novolak rather than a resole. The novolak precursor is reacted via a diazo coupling reaction with the diazo group-containing modifying agent so that the diazo group forms a divalent diazo linkage (—N═) to an active site on an aromatic ring of the backbone structure of the novolak precursor. Consequently, the modifying agent structure (including the ionic moiety) is incorporated into the phenolic structure through the diazo linkage. An example of such diazo modifying agents is 1-diazo-2-naphthol-4-sulfonic acid.

The modifying agent also can optionally include a functional moiety that is capable of chelating with a metal ion that is present on a substrate surface on which the phenolic resin dispersion is applied. The chelating group remains as a residual group after the condensation of the phenolic resin precursor and the aromatic modifying agent. Typically, the chelating group is a substituent on the aromatic ring that is capable of forming a 5- or 6-membered chelation structure with a metal ion. Examples of such substituents include hydroxy and hydroxyalkyl, with hydroxy being preferred. At least two such functional groups must be present on the modifying agent molecule to provide the chelating. In the case of an aromatic modifying agent, the chelating groups should be located in an ortho position relative to each other. A significant advantage of the invention is that hydroxy or hydroxyalkyl substituents on the aromatic modifying agent can serve two roles—condensation enablement and subsequent metal chelating.

An aromatic modifying agent is particularly advantageous. Preferably, the ionic group and the reaction-enabling moiety are not substituents on the same aromatic ring. The ionic group, particularly sulfonate, appears to have a strong deactivating effect on condensation reactions of the ring to which it is attached. Consequently, an ionic group attached to the same ring as the reaction-enabling moiety would not allow the modifying agent to readily react with the phenolic resin precursor. However, it should be recognized that this consideration for the location of the ionic and reaction-enabling moieties is not applicable to the formyl group-containing modifying agent and diazo modifying agent.

A preferred structure for the aromatic modifying agent is represented by formulae Ia or Ib below:

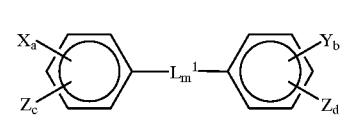

Formula Ia

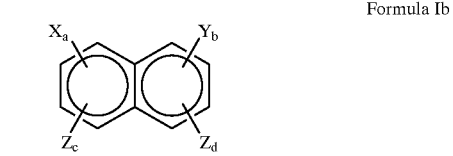

Formula Ib wherein X is the ionic group; Y is the reaction-enabling substituent; Z is the chelating substituent; L$^1$ is a divalent linking group such as an alkylene radical (for example, methylene) or a diazo (—N═N—); a is 1; b is 1 to 4; m is 0 or 1; and c and d are each independently 0 to 3, provided there are not more than 4 substituents on each aromatic ring. If a chelating group Z is present it is positioned ortho to another chelating group Z or to Y. It should be recognized that the reaction-enabling substituent Y may also act as a chelating substituent. In this instance, the aromatic modifying agent may not include an independent chelating substituent Z. An aromatic modifying agent according to formulae Ia or Ib could also include other substituents provided they do not adversely interfere with the ionic group or the condensation reaction.

Illustrative aromatic modifying agents include salts of 6,7-dihydroxy-2-napthalenesulfonate; 6,7-dihydroxy-1-naphthalenesulfonate; 6,7-dihydroxy-4-napthalenesulfonate; Acid Red 88; Acid Alizarin Violet N; Erichrome Black T; Erichrome Blue Black B; Brilliant Yellow; Crocein Orange G; Biebrich Yellow; and Palatine Chrome Black 6BN. 6,7-dihydroxy-2-naphthalenesulfonate, sodium salt is the preferred aromatic modifying agent.

It should be recognized that the preferred sulfonate modification contemplated herein involves an indirect sulfonation mechanism. In other words, the aromatic modifying agent includes a sulfonate group and is reacted with another aromatic compound (the phenolic resin precursor) to obtain the chain extended, sulfonate-modified phenolic resin product. This indirect sulfonation is distinctly different than direct sulfonation of the phenolic resin precursor.

Any phenolic resin could be employed as the phenolic resin precursor, but it has been found that resoles are especially suitable. The resole precursor should have a sufficient amount of active alkylol or benzyl ether groups that can initially condense with the modifying agent and then undergo further subsequent condensation. Of course, the phenolic resin precursor has a lower molecular weight than the final dispersed resin since the precursor undergoes condensation to make the final dispersed resin. Resoles are prepared by reacting a phenolic compound with an excess of an aldehyde in the presence of a base catalyst. Resole resins are usually supplied and used as reaction product mixtures of monomeric phenolic compounds and higher molecular weight condensation products having alkylol (—ArCH$_2$—OH) or benzyl ether termination (—ArCH$_2$—O—CH$_2$Ar), wherein Ar is an aryl group. These resole mixtures or prepolymers (also known as stage A resin) can be transformed into three-dimensional, crosslinked, insoluble and infusible polymers by the application of heat.

The reactants, conditions and catalysts for preparing resoles suitable for the resole precursor of the present invention are well-known. The phenolic compound can be any of those previously listed or other similar compounds, although multi-hydroxy phenolic compounds are undesirable. Particularly preferred phenolic compounds for making the resole precursor include phenol per se and alkylated phenol. The aldehyde also can be any of those previously listed or other similar compounds, with formaldehyde being preferred. Low molecular weight, water soluble or partially water soluble resoles are preferred as the precursor because such resoles maximize the ability to condense with the modifying agent. The F/P ratio of the resole precursor should be at least 0.90. Illustrative commercially available resoles that are suitable for use as a precursor include a partially water soluble resole available from Georgia Pacific under the trade designation BRL 2741 and a partially water soluble resoles available from Schenectady International under the trade designations HRJ11722 and SG3100.

As described above, the dispersed phenolic resin reaction product according to the invention can be hydrophilic or hydrophobic, but hydrophilic is preferred. In addition, dispersed resoles or novolaks can be obtained depending upon the selection and amount of reactants.

Preferably, the dispersed resole is produced by reacting or mixing 1 mol of modifying agent(s) with 1 to 20 mol of phenolic resin precursor(s). A dispersed resole typically can be obtained by reacting or mixing a resole precursor or a mixture of resole precursors with the modifying agent or a mixture of agents without any other reactants, additives or catalysts. However, other reactants, additives or catalysts can be used as desired. Multi-hydroxy phenolic compound(s) can optionally be included in relatively small amounts in the reactant mixture for the resole.

Hydrophilic resoles typically have a F/P ratio of at least 1.0. According to the invention, hydrophilic resoles having a F/P ratio much greater than 1.0 can be successfully dispersed. For example, it is possible to make an aqueous dispersion of hydrophilic resoles having a F/P ratio of at least 2 and approaching 3, which is the theoretical F/P ratio limit.

Preferably, the dispersed novolak is produced by reacting 1 mol of modifying agent with 2–20 mol of the phenolic resin (preferably resole) precursor(s) and, preferably, 2–20 mol of multi-hydroxy phenolic compound(s). An aldehyde compound, preferably formaldehyde, is also required to make the novolak. The aldehyde compound can optionally be added as a separate ingredient in the initial reaction mixture or the aldehyde compound can be generated in situ from the resole precursor. The resole precursor(s), multi-hydroxy phenolic compound(s) and modifying agent(s) co-condense to form the dispersed novolak. The reaction typically is acid catalyzed with an acid such as phosphoric acid. The F/P ratio of aldehyde compound(s) to combined amount of resole precursor(s) and multi-hydroxy phenolic compound(s) in the initial reaction mixture preferably is less than 0.9. Preferably, synthesis of the dispersed novolak is a two stage reaction. In the first stage, the resole precursor(s) is reacted with the modifying agent(s) and, optionally, a small amount of multi-hydroxy phenolic compound(s). Once this first stage reaction has reached the desired point (i.e., the resin can be readily formed into a translucent dispersion), the acid catalyst and a greater amount of multi-hydroxy phenolic compound(s) is added to the reaction mixture. Pyrocatechol (also simply known as catechol) is a preferred multi-hydroxy phenolic compound for reacting in the first stage and resorcinol is a preferred multi-hydroxy phenolic compound for reacting in the second stage.

Hydrophilic novolaks typically have a hydroxy equivalents of between 1 and 3 per aromatic ring. Preferably, dispersed hydrophilic novolaks according to the invention have a hydroxy equivalents of 1.1 to 2.5, more preferably 1.1 to 2.0. The hydroxy equivalents is calculated based on the amount of multi-hydroxy phenolic compounds used to make the novolak.

According to a preferred embodiment, the dispersed phenolic resin reaction product contains a mixture of oligomers having structures believed to be represented by the following formulae IIa or IIb:

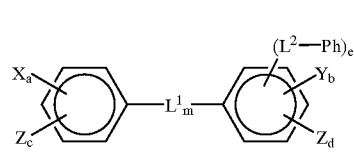

Formula IIa

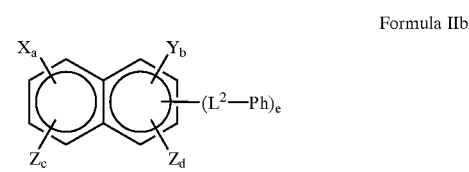

Formula IIb wherein X, Y, Z and L$^1$ and subscripts a, b, c, d and m are the same as in formulae Ia and Ib, e is 1 to 6, L$^2$ is a divalent linking group and Ph is the phenolic resin backbone structure, provided the —(L$^2$—Ph) group(s) is(are) ortho or para to a Y group. L$^2$ depends upon the particular phenolic resin, but typically is a divalent alkylene radical such as methylene (—CH$_2$—) or oxydimethylene (—CH$_2$—O—CH$_2$—). Preferably, e is 2 and the —(L$^2$—Ph) groups are in para position to each other.

According to a particularly preferred embodiment wherein the phenolic resin is a resole and the modifying agent is a naphthalene having a ionic pendant group X and two reaction-enabling substituents Y, the dispersed phenolic resin reaction product contains a mixture of oligomers having structures believed to be represented by the following formula III:

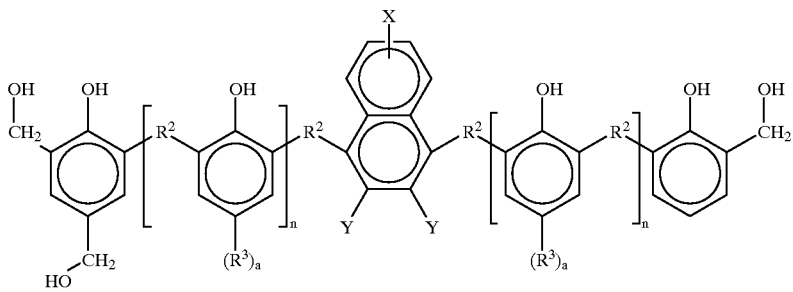

wherein X and Y are the same as in formulae Ia and Ib, a is 0 or 1; n is 0 to 5; $R^2$ is independently —$C(R^5)_2$— or —$C(R^5)_2$—O—$C(R^5)_2$—, wherein $R^5$ is independently hydrogen, alkylol, hydroxyl, alkyl, aryl or aryl ether; and $R^3$ is independently alkylol, alkyl, aryl, alkylaryl or aryl ether. Preferably, $R^2$ is methylene or oxydimethylene and $R^3$ is methylol. If 6,7-dihydroxy-2-naphthalenesulfonate, sodium salt is the modifying agent, X will be $SO_3^-Na^+$ and each Y will be OH. It should be recognized that in this case the hydroxy groups for Y will also act as chelating groups with a metal ion.

According to another preferred embodiment wherein the phenolic resin is a novolak and the modifying agent is a naphthalene having a ionic pendant group X and two reaction-enabling substituents Y, the dispersed phenolic resin reaction product contains a mixture of oligomers having structures believed to be represented by the following formula IV:

persed phenolic resins have 0.01 to 0.10, preferably 0.03 to 0.06, equivalents of sulfonate functionality/100 g resin. The aqueous dispersion of the phenolic resin preferably has a solids content of 1 to 50, preferably 15 to 30.

The phenolic resin dispersion of the invention has numerous advantageous characteristics and properties. The dispersion has a very small amount of VOCs (approximately 10 weight percent at the most, based on the total amount of VOC and dispersed phenolic resin) or preferably is substantially free of VOCs. The dispersion is also infinitely water-dilutable. In other words, the dispersion can be produced and/or supplied to a customer in the form of a concentrate that can be diluted with water at the time of use without destroying the effectiveness of the dispersion. The novolak version dispersion is storage stable at a low pH. This acid tolerance is critical when the dispersion is mixed with an acid in a multi-component end-use composition. It should be recognized that gellation of the modified phenolic resin is

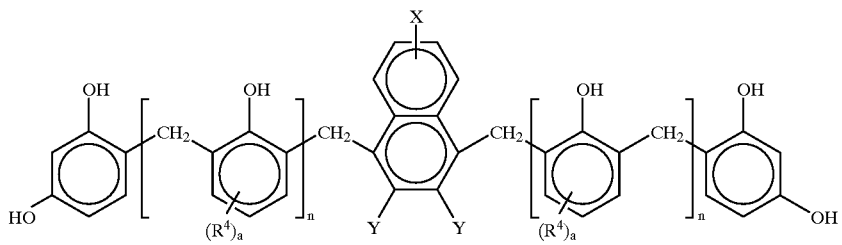

wherein X and Y are the same as in formulae Ia and Ib, a is 0 or 1, n is 0 to 5 and $R^4$ is independently hydroxyl, alkyl, aryl, alkylaryl or aryl ether. Preferably, $R^4$ is tert-butyl. If 6,7-dihydroxy-2-naphthalenesulfonate, sodium salt is the modifying agent, X will be $SO_3^-Na^+$ and each Y will be OH. In this case the hydroxy groups for Y will also act as chelating groups with a metal ion.

It should be recognized that the dispersed phenolic resin reaction product may also contain oligomers or compounds having structures that vary from the idealized structures shown in formulae III and IV.

If the modifying agent includes a sulfur-containing ionic group, the resulting modified phenolic resin should have a carbon/sulfur atom ratio of 20:1 to 200:1, preferably 20:1 to 100:1. If the sulfur content is greater than the 20:1 carbon/sulfur atom ratio, the modified phenolic resin begins to become water soluble, is more stable with respect to multivalent ions and is difficult to thermoset. These characteristics are adverse to the preferred use of the phenolic resin dispersion of the invention. If the sulfur content is below the 200:1 carbon/sulfur atom ratio, then the resin dispersion cannot maintain its stability. Viewed another way, the disundesirable since it would be detrimental to the formation of an aqueous dispersion.

The phenolic resin dispersion according to the invention also forms environmentally (especially corrosion) resistant, non-resolvatable films when applied to a substrate and cured. As used herein, "non-resolvatable" means that the phenolic resin dispersion coating does not resolvate when an aqueous covercoat is applied to the coating before it is thermoset. If the film resolvated, the components of the film would dissolve or disperse into the aqueous covercoat thus destroying any advantage intended from the formation of the film on a surface. The low ionic content of the modified phenolic resin dispersion (relative to water soluble phenolic resins) allows them to behave similarly to non-ionically modified resins and form very water resistant films on curing. Moreover, a cured film formed from a composition that contains the phenolic resin dispersion of the invention exhibits superior environmental resistance to heat, chemically aggressive fluids and corrosive environments. In other words, the film resists degradation or failure to stressful conditions caused by the environment in which the film is used.

The modified phenolic resin dispersion of the invention can be cured to form a highly crosslinked thermoset via known curing methods for phenolic resins. The curing mechanism can vary depending upon the use and form of the phenolic resin dispersion. For example, curing of the dispersed resole embodiment typically can be accomplished by subjecting the phenolic resin dispersion to heat. Curing of the dispersed novolak embodiment typically can be accomplished by addition of an aldehyde donor compound.

The modifying agent and the phenolic resin precursor can be reacted or mixed under conditions effective to promote condensation of the modifying agent with the phenolic resin precursor. The reaction is carried out in water under standard phenolic resin condensation techniques and conditions. The reactant mixture (including water) generally is heated from 50 to 100° C. under ambient pressure, although the specific temperature may differ considerably depending upon the specific reactants and the desired reaction product. The resulting product is a concentrate that is self-dispersible upon the addition of water and agitation to reach a desired solids content. The final dispersion can be filtered to remove any gelled agglomerations.

The intermediate modified resoles or novolaks that are initially produced in the synthesis are not necessarily water dispersible, but as the chain extension is advanced the resulting chain extended modified resoles or novolaks become progressively more water dispersible by simple mechanical agitation. The chain extension for the dispersed resole is determined by measuring the viscosity of the reaction mixture. Once the resole reaction mixture has a reached the desired viscosity, which varies depending upon the reactant composition, the reaction is stopped by removing the heat. The chain extension for the dispersed novolak is determined by pre-selecting the F/P ratio of the total reaction mixture (in other words, the amount of aldehyde compound(s) relative to the amount of phenolic(s) in both the first and second stages). The reaction for the novolak is allowed to proceed until substantially all the total amount of the reactants have reacted. In other words, there is essentially no unreacted reactant remaining. Preferably, the molecular weight (i.e., chain extension) of both the resole and novolak should be advanced to just below the gel point.

The phenolic resin dispersion of the invention is particularly useful in aqueous coating, adhesive or primer compositions as described, for example, in commonly-assigned, co-pending U.S. patent application Ser. Nos. 09/235,778 and 09/235,201, both filed Jan. 22, 1999. It is especially useful in a composition that is applied to a metallic surface. In addition to the advantageous characteristics described above, addition of the phenolic resin dispersion into a multi-component composition mixture can render the composition autodepositable when applied to a metallic substrate. The general principles and advantages of autodeposition is explained in a multitude of patents assigned to Parker Amchem and/or Henkel (see, for example, U.S. Pat. Nos. 4,414,350; 4,994,521; 5,427,863; 5,061,523 and 5,500, 460).

The invention will be described in more detail by way of the following non-limiting examples.

EXAMPLE 1—PREPERATION OF A DISPERSED RESOLE 250 g of a water soluble resole (made from formaldehyde and phenol, F/P ratio of 2.3, 80% solids and commercially available from Schenectady under the trade designation HRJ11722), 40 g of 6,7-dihydroxy-2-naphthalenesulfonate, sodium salt (commercially available from Andrew Chemicals) and 50 g of water are mixed together and steam heated between 95–100° C. for approximately 3 hours. The mixture becomes a very thick and opaque concentrate. 850 g of water is mixed with the resulting concentrate causing the concentrate to self-disperse. The dispersion is filtered to remove any agglomerations to provide a translucent dispersion.

EXAMPLE 2—PREPERATION OF A DISPERSED NOVOLAK 80 g of 6,7-dihydroxy-2-naphthalenesulfonate, sodium salt (commercially available from Andrew Chemicals), 272 g of HRJ11722 resole, 100 g of tert-butyl catechol and 50 g of water were initially mixed then steam heated at 95–100° C. for approximately 3 hours. The mixture first was hazy then became clear and progressed to increased viscosity and turbidity as the condensation reaction proceeded. After an additional period of reaction time, the resin appeared very viscous and could be dispersed to provide a hazy translucent dispersion. At this point, 440 g of resorcinol in 440 g of water were added and then 12 g of phosphoric acid in 25 g of water were added. Heating was continued. 130 g of formalin then was added at a controlled rate. The resin refluxed and became more viscous as the reaction proceeded resulting in a concentrate. 2885 g of water was added to the concentrate, the concentrate self-dispersed, and the dispersion was filtered to produce a pale yellow dispersion.

EXAMPLE 3—PREPERATION OF A DISPERSED NOVOLAK 20 g of 6,7-dihydroxy-2-naphthalenesulfonate, sodium salt (commercially available from Andrew Chemicals), 125 g of HRJ11722 resole, 20 g of octylgallate, 25 g of water are mixed together and steam heated at 95–100° C. for approximately one and one-half hours. 120 g of resorcinol in 130 g of water and 2 g of phosphoric acid were added to the mixture. Steam heating was continued for approximately another hour. At this point the mixture had become a very viscous concentrate. 800 g of water was added to the concentrate, the concentrate self-dispersed, and the dispersion was filtered to produce a yellow translucent dispersion. This dispersion was coated onto a glass side and dried for 5 minutes at 150° F. to form a film. Resolvation resistance of this film was very good.

EXAMPLE 4—PREPARATION OF A DISPERSED NOVOLAK 30 g of 6,7-dihydroxy-2-naphthalenesulfonate, sodium salt (commercially available from Andrew Chemicals), 334 g of a water soluble resole (made from formaldehyde and phenol, F/P ratio of 0.95, 67% solids and commercially available from Schenectady under the trade designation SG3100), 40 g of tert-butyl phenol and 50 g of water were mixed together and steam heated at 95–100° C. 50 g of water then were added and stem heated was continued until the mixture was very viscous and turbid. 220 g of resorcinol, 50 g of water and 3 g of phosphoric acid were added to the mixture and steam heated for 10 minutes. 100 g of formalin (37% solids) then was added and the mixture was stem heated for approximately another hour to produce a concentrate. 2050 g of water was added to the concentrate, the concentrate self-dispersed, and the dispersion was filtered.

EXAMPLE 5—PREPARATION OF A DISPERSED NOVOLAK 15 g of 6,7-dihydroxy-2-naphthalenesulfonate, sodium salt (commercially available from Andrew Chemicals), 40 g of a water soluble resole (made from formaldehyde and phenol, F/P ratio of 0.95, 67% solids and commercially available from Schenectady under the trade designation SG3100) and 25 g of water were mixed together and steam heated at 95–100° C. for approximately two hours. 127 g more of the SG3100 resole, 20 g of tert-butyl phenol and 50 g of water were added to the mixture and steam heating was continued for approximately 4 and one-half hours. 13 g of pyrogallol, 100 g of resorcinol, 2 g of phosphoric acid and 50 g of water were then added to the mixture and steam heating was continued for approximately 1 hour and 45 minutes. 43 g of formalin (37% solids) then was added and steam heating was continued for another 1 and one-half hours to produce a concentrate. 1075 g of water was added to the concentrate, the concentrate self-dispersed and the dispersion was filtered.

EXAMPLE 6—PREPARATION OF A DISPERSED RESOLE 500 g of a water soluble, low molecular weight resole (made from formaldehyde and phenol, having a F/P ratio of 1.8, 85% solids and commercially available from Georgia-Pacific under the trade designation BRL 2741), 50 g of pyrogallol as a metal chelator, 50 g of 6,7-dihydroxy-2-naphthalenesulfonate, sodium salt (commercially available from Andrew Chemicals) and 200 g of water were mixed together and steam heated at 95–100° C. for approximately one hour until the mixture became a very viscous concentrate. 2000 g of water was added to the concentrate, the concentrate self-dispersed and the dispersion was filtered.

EXAMPLE 7—PREPARATION OF DISPERSED NOVOLAKS WITH DIFFERENT MODIFYING AGENTS 200 g of resorcinol, 20 g of pyrogallol, 12 g of phosphoric acid (85% aqueous solution) and 220 g of water were mixed together and heated to 95° C. When 95° C. was reached, 250 g of formalin (18.5% aqueous solution) was fed to the reaction mixture over a period of 30 minutes. Steam heating was continued for another 15 minutes at which point the mixture was slightly turbid and had a low viscosity (a sample precipitated out of solution upon dilution with water). 32 g of 2-formylbenzenesulfonic acid (sodium salt, 75% moist solid) and 40 more g of formalin then was added. After one hour and 15 minutes of steam heating the resin was very viscous. 580 g of water was added to the resin mixture and steam heating was continued until the resin was completely dispersible. Using essentially the same procedure 5-formyl-2-furan sulfonate and 1-diazo-2-naphthol-4-sulfonate stabilized (i.e., substituted for 2-formylbenzenesulfonic acid) resorcinol/pyrogallol novolak aqueous dispersions were prepared.

EXAMPLE 8—PREPARATION OF A DISPERSED NOVOLAK

A phenolic novolak resin aqueous dispersion was made by mixing together 160 g of sodium salt of 6,7-dihydroxy-2-naphthalenesulfonate, 544 g of a water soluble resole (made from formaldehyde and phenol, F/P ratio of 2.3, 80% solids and commercially available from Schenectady under the trade designation HRJ11722), 200 g of catechol and 200 g of water and steam heating for approximately two hours until the reaction mixture became very viscous and provided a clear dispersion. 880 g of resorcinol and 500 g of water were added followed by 12 g of phosphoric acid in 10 g of water. Steam heating was continued for another 15 minutes. 640 g of formalin (18.5% aqueous solution) then was added while continuing steam heating resulting in a resin concentrate. The concentrate was filtered and self-dispersed upon the addition of 5900 g of water.

What is claimed is:

1. A curable aqueous phenolic resin dispersion comprising a reaction product of:
   (a) a phenolic resin precursor; and
   (b) a modifying agent wherein the modifying agent includes:
      (i) at least one functional moiety that enables the modifying agent to react with the phenolic resin precursor; and
      (ii) at least one ionic moiety.
2. A dispersion according to claim 1 wherein the modifying agent is an aromatic compound.
3. A dispersion according to claim 1 wherein the ionic moiety of the modifying agent is selected from a sulfate, sulfonate, sulfinate, sulfenate or oxysulfonate and the dispersed phenolic resin reaction product has a carbon/sulfur atom ratio of 20:1 to 200:1.
4. A dispersion according to claim 1 wherein the phenolic resin precursor comprises a resole.
5. A dispersion according to claim 4 wherein the resole has a F/P ratio of at least 0.90.
6. A dispersion according to claim 2 wherein the phenolic resin precursor comprises a resole.
7. A dispersion according to claim 3 wherein the phenolic resin precursor comprises a resole.
8. A dispersion according to claim 2 wherein the aromatic modifying agent includes at least two aromatic rings.
9. A dispersion according to claim 8 wherein the reaction-enabling moiety and the ionic moiety are bound to separate aromatic rings.
10. A dispersion according to claim 2 wherein the aromatic modifying agent comprises a structure represented by formula Ia or Ib:

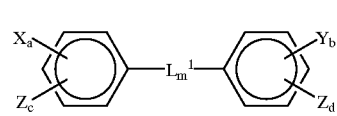

Formula Ia

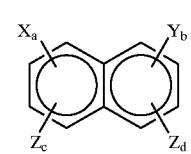

Formula Ib wherein X is the ionic moiety; Y is the reaction-enabling moiety; Z is a chelating substituent; $L^1$ is a divalent linking group; a is 1; b is 1 to 4; m is 0 or 1; and c and d are each independently 0 to 3, provided there are not more than 4 substituents on each aromatic ring.

11. A dispersion according to claim 10 wherein X is selected from a sulfate, sulfonate, sulfinate, sulfenate or oxysulfonate.
12. A dispersion according to claim 10 wherein Y comprises a hydroxy or hydroxyalkyl.
13. A dispersion according to claim 10 wherein Z comprises a hydroxy or hydroxyalkyl.
14. A dispersion according to claim 1 wherein the reaction-enabling moiety is selected from hydroxy, hydroxyalkyl, formyl or diazo.
15. A dispersion according to claim 14 wherein the reaction-enabling moiety is selected from hydroxy or hydroxyalkyl.

16. A dispersion according to claim 11 wherein the dispersed phenolic resin reaction product has a carbon/sulfur atom ratio of 20:1 to 200:1.

17. A dispersion according to claim 11 wherein the ionic moiety comprises a sulfonate.

18. A dispersion according to claim 11 wherein Y comprises a hydroxy or hydroxyalkyl.

19. A dispersion according to claim 18 wherein the phenolic resin precursor comprises a resole.

20. A dispersion according to claim 1 wherein the modifying agent comprises dihydroxy naphthalenesulfonate.

21. A dispersion according to claim 20 wherein the modifying agent comprises 6,7-dihydroxy-2-naphthalenesulfonate.

22. A dispersion according to claim 21 wherein the phenolic resin precursor comprises a resole.

23. A dispersion according to claim 1 wherein the dispersed phenolic resin is a hydrophilic resole.

24. A dispersion according to claim 23 wherein the resole comprises a structure represented by:

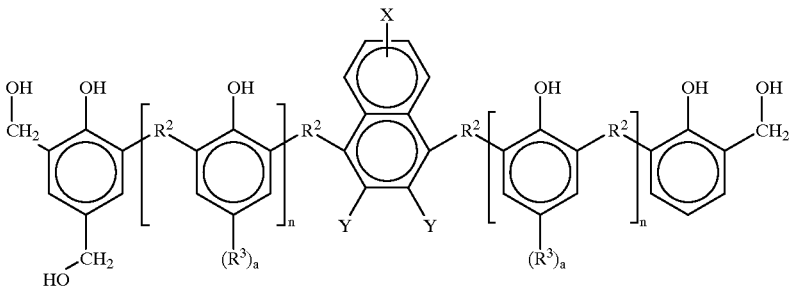

wherein X is the ionic moiety; Y is the reaction-enabling moiety; a is 0 or 1; n is 0 to 5; $R^2$ is independently —$C(R^5)_2$— or —$C(R^5)_2$—O—$C(R^5)_2$—, wherein $R^5$ is independently hydrogen, alkylol, hydroxyl, alkyl, aryl or aryl ether; and $R^3$ is independently alkylol, alkyl, aryl, alkylaryl or aryl ether.

25. An aqueous novolak resin dispersion comprising a reaction product of:
(a) a phenolic resin precursor; and
(b) a modifying agent wherein the modifying agent includes:
(i) at least one functional moiety that enables the modifying agent to react with the phenolic resin precursor; and
(ii) at least one ionic moiety.

26. A dispersion according to claim 1 further comprising at least one multi-hydroxy phenolic compound as an additional reactant for making the reaction product.

27. A dispersion according to claim 26 wherein the multi-hydroxy phenolic compound is selected from resorcinol, pyrocatechol, hydroquinone, pyrogallol, 1,3,5-benzenetriol and tert-butyl catechol.

28. A dispersion according to claim 27 wherein the multi-hydroxy phenolic compound is selected from resorcinol or pyrocatechol.

29. A dispersion according to claim 28 wherein the phenolic resin precursor comprises a resoleand the modifying agent comprises 6,7-dihydroxy-2-naphthalenesulfonate.

30. A dispersion according to claim 29 further comprising phosphoric acid as a catalyst and an aldehyde compound as an additional reactant for making the reaction product.

31. A dispersion according to claim 1 wherein the dispersion is substantially infinitely water-dilutable.

32. An aqueous phenolic resin dispersion made by:
(I) mixing together and heating a mixture comprising
(a) a phenolic resin precursor; and
(b) a modifying agent wherein the modifying agent includes:
(i) at least one functional moiety that enables the modifying agent to mix with the phenolic resin precursor; and
(ii) at least one ionic moiety; and
(II) dispersing the product of step (I) into water.

33. A dispersion according to claim 32 wherein the heating is at 50 to 100° C.

34. A dispersion according to claim 32 wherein the modifying agent is mixed with the phenolic resin precursor in a ratio of 1 mol:1 to 20 mols.

35. A dispersion according to claim 32 wherein the modifying agent is mixed with the phenolic resin precursor in a ratio of 1 mol:2 to 20 mols.

36. A dispersion according to claim 32 further comprising mixing at least one multi-hydroxy phenolic compound to make a dispersed novolak.

37. A dispersion according to claim 36 further comprising mixing an acid catalyst.

38. A dispersion according to claim 32 wherein the phenolic resin precursor is a resole.

39. A dispersion according to claim 32 wherein the modifying agent is an aromatic compound.

40. A dispersion according to claim 32 wherein the ionic moiety of the modifying agent is selected from a sulfate, sulfonate, sulfinate, sulfenate or oxysulfonate and the dispersed phenolic resin reaction product has a carbon/sulfur atom ratio of 20:1 to 200:1.

41. A dispersion according to claim 32 wherein the modifying agent comprises a structure represented by formula Ia or Ib:

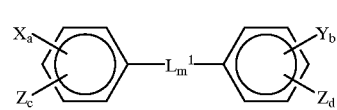
Formula Ia

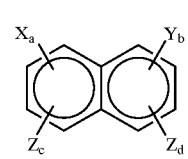
Formula Ib wherein X is the ionic moiety; Y is the mixing-enabling moiety; Z is a chelating substituent; $L^1$ is a divalent linking group; a is 1; b is 1 to 4; m is 0 or 1; and c and d are each independently 0 to 3, provided there are not more than 4 substituents on each aromatic ring.

42. A dispersion according to claim 41 wherein X is selected from a sulfate, sulfonate, sulfinate, sulfenate or oxysulfonate and Y is selected from hydroxy or hydroxyalkyl.

43. A dispersion according to claim 32 wherein the modifying agent is selected from a sulfonated naphthalene, a sulfonated formyl group-containing compound or a sulfonated diazo compound.

44. A dispersion according to claim 43 wherein the modifying agent comprises dihydroxy naphthalenesulfonate.

45. A dispersion according to claim 44 wherein the phenolic resin precursor comprises a resole.

46. A method for making an aqueous phenolic resin comprising:
 (I) mixing together and heating a mixture comprising
  (a) a phenolic resin precursor; and
  (b) a modifying agent wherein the modifying agent includes:
   (i) at least one functional moiety that enables the modifying agent to mix with the phenolic resin precursor; and
   (ii) at least one ionic moiety; and
 (II) dispersing the product of step (I) into water.

47. A method according to claim 46 wherein the heating is at 50 to 100° C.

48. A method according to claim 46 wherein the mixing occurs at conditions effective to react the phenolic resin precursor and the modifying agent.

49. A method according to claim 48 wherein the reaction is a condensation reaction.

50. A method according to claim 46 wherein the mixing is effected in water.

51. A method according to claim 46 wherein the the modifying agent is mixed with the phenolic resin precursor in a ratio of 1 mol:1 to 20 mols.

52. A method according to claim 46 wherein the modifying agent is mixed with the phenolic resin precursor in a ratio of 1 mol:2 to 20 mols.

53. A method according to claim 46 further comprising mixing at least one multi-hydroxy phenolic compound to make a dispersed novolak.

54. A method according to claim 53 further comprising mixing an acid catalyst.

55. A method according to claim 46 wherein the phenolic resin precursor is a resole.

56. A method according to claim 46 wherein the modifying agent is an aromatic compound.

57. A method according to claim 46 wherein the ionic moiety of the modifying agent is selected from a sulfate, sulfonate, sulfinate, sulfenate or oxysulfonate and the dispersed phenolic resin reaction product has a carbon/sulfur atom ratio of 20:1 to 200:1.

58. A method according to claim 46 wherein the modifying agent comprises a structure represented by formula Ia or Ib:

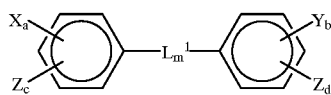

Formula Ia

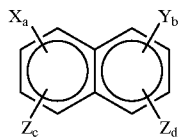

Formula Ib wherein X is the ionic moiety; Y is the mixing-enabling moiety; Z is a chelating substituent; $L^1$ is a divalent linking group; a is 1; b is 1 to 4; m is 0 or 1; and c and d are each independently 0 to 3, provided there are not more than 4 substituents on each aromatic ring.

59. A method according to claim 58 wherein X is selected from a sulfate, sulfonate, sulfinate, sulfenate or oxysulfonate and Y is selected from hydroxy or hydroxyalkyl.

60. A method according to claim 46 wherein the modifying agent is selected from a sulfonated naphthalene, a sulfonated formyl group-containing compound or a sulfonated diazo compound.

61. A method according to claim 60 wherein the modifying agent comprises dihydroxy naphthalenesulfonate.

62. A method according to claim 61 wherein the phenolic resin precursor comprises a resole.

63. A method for providing a coating on a metallic surface comprising
 applying to the surface an aqueous phenolic resin dispersion wherein the aqueous phenolic resin dispersion comprises a reaction product of:
  (a) a phenolic resin precursor; and
  (b) a modifying agent wherein the modifying agent includes:
   (i) at least one functional moiety that enables the modifying agent to react with the phenolic resin precursor; and
   (ii) at least one ionic moiety.

64. A method according to claim 63 comprising applying to the surface a composition that includes the aqueous phenolic resin dispersion.

65. A dispersion according to claim 20 wherein the modifying agent comprises a sulfonated formyl group-containing compound.

66. A dispersion according to claim 65 wherein the modifying agent comprises a formylbenzene sulfonate compound.

67. A dispersion according to claim 43 wherein the modifying agent comprises a sulfonated formyl group-containing compound.

68. A method according to claim 60 wherein the modifying agent comprises a sulfonated formyl group-containing compound.

69. A dispersion according to claim 1 wherein the ionic moiety is selected from sulfonate (—S(O)$_2$O$^-$M$^+$), sulfinate (—S(O)O$^-$M$^+$), sulfenate (—SO$^-$M$^+$) or oxysulfonate (—OS(O)$_2$O$^-$M$^+$), wherein M is a monovalent ion selected from Na, Li, K or NR$^1_3$, wherein R$^1$ is hydrogen or an alkyl.

70. A dispersion according to claim 32 wherein the ionic moiety is selected from sulfonate (—S(O)$_2$O$^-$M$^+$), sulfinate (—S(O)O$^-$M$^+$), sulfenate (—SO$^-$M$^+$) or oxysulfonate (—OS(O)$_2$O$^-$M$^+$), wherein M is a monovalent ion selected from Na, Li, K or NR$^1_3$, wherein R$^1$ is hydrogen or an alkyl.

71. A method according to claim 46 wherein the ionic moiety is selected from sulfonate (—S(O)$_2$O$^-$M$^+$), sulfinate (—S(O)O$^-$M$^+$), sulfenate (—SO$^-$M$^+$) or oxysulfonate (—OS(O)$_2$O$^-$M$^+$), wherein M is a monovalent ion selected from Na, Li, K or NR$^1_3$, wherein R$^1$ is hydrogen or an alkyl.

72. A dispersion according to claim 25 wherein the novolak comprises a structure represented by:

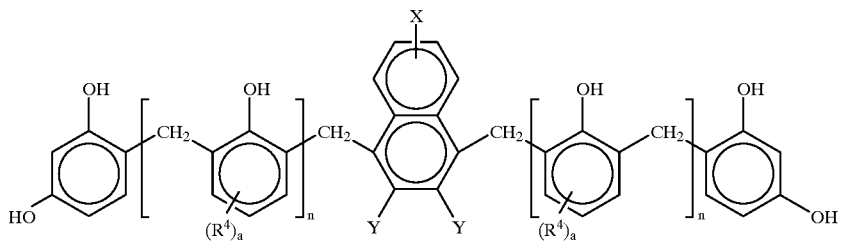

wherein X is the ionic moiety; Y is the reaction-enabling moeity; a is 0 or 1, n is 0 to 5 and $R^4$ is independently hydroxyl, alkyl, aryl, alkylaryl or aryl ether.

73. An aqueous phenolic resin dispersion comprising a reaction product of a phenolic resin precursor and a modifying agent wherein the modifying agent is selected from a sulfonated naphthalene compound, a sulfonated formyl group-containing compound or a sulfonated diazo compound.

74. A dispersion according to claim 1 wherein the dispersion has a shelf-life stability of at least three months.

75. An aqueous phenolic resin dispersion made by:
 (a) mixing together and heating a mixture comprising at least one multi-hydroxy phenolic compound, at least one acid, at least one aldehyde compound and water; then
 (b) mixing at least one of a sulfonated naphthalene compound, a sulfonated formyl group-containing compound or a sulfonated diazo compound into the product of step (a) and heating; and
 (c) dispersing the product of step (b) into water.

76. An aqueous novolak resin dispersion according to claim 25 wherein the ionic moiety is selected from a sulfate, sulfonate, sulfinate, sulfenate or oxysulfonate and the reaction-enabling moiety is selected from hydroxy, hydroxyalkyl, formyl or diazo.

77. A dispersion according to claim 32 wherein the ionic moiety is selected from a sulfate, sulfonate, sulfinate, sulfenate or oxysulfonate and the functional moiety is selected from hydroxy, hydroxyalkyl, formyl or diazo.

78. A method according to claim 46 wherein the ionic moiety is selected from a sulfate, sulfonate, sulfinate, sulfenate or oxysulfonate and the functional moiety is selected from hydroxy, hydroxyalkyl, formyl or diazo.

79. A dispersion according to claim 25 wherein the modifying agent is selected from a sulfonated naphthalene compound, a sulfonated formyl group-containing compound or a sulfonated diazo compound.

80. A dispersion according claim 32 wherein the dispersed phenolic resin is curable.

81. A method according to claim 46 wherein the dispersed phenolic resin is curable.

* * * * *